April 28, 1970 C. F. HABERLY 3,509,537
DIGITAL COMMUNICATION APPARATUS FOR A POWER DISTRIBUTION LINE
Filed Oct. 31, 1966
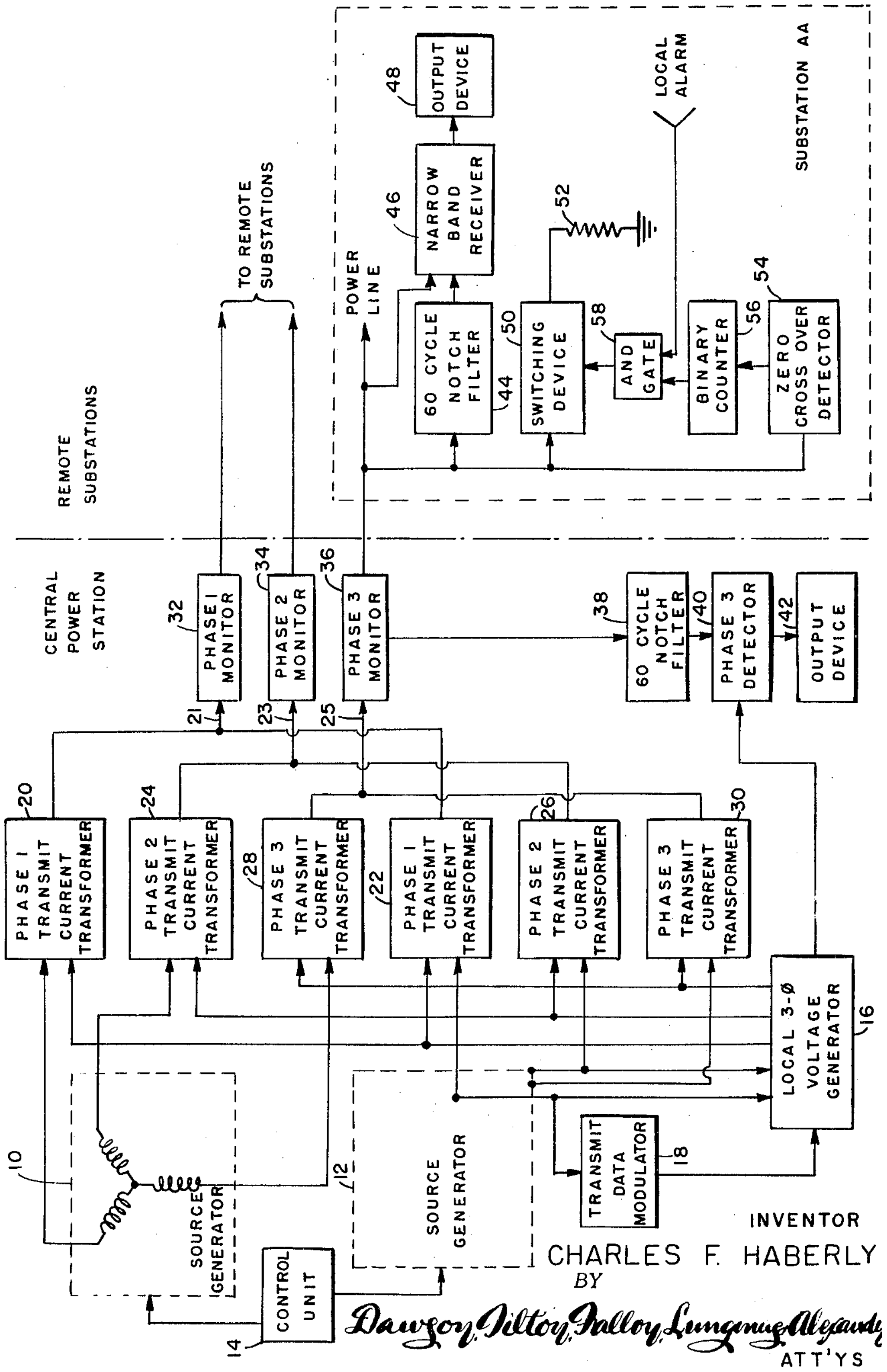
INVENTOR
CHARLES F. HABERLY
BY
Dawson, Tilton, Fallon, Lungmus & Alexander
ATT'YS

United States Patent Office 3,509,537
Patented Apr. 28, 1970

3,509,537

DIGITAL COMMUNICATION APPARATUS FOR A POWER DISTRIBUTION LINE

Charles F. Haberly, Cedar Rapids, Iowa, assignor to Iowa State University Research Foundation, Inc., Ames, Iowa, a corporation of Iowa

Filed Oct. 31, 1966, Ser. No. 590,828
Int. Cl. H04q *9/00*
U.S. Cl. 340—163 10 Claims

ABSTRACT OF THE DISCLOSURE

Digital communication apparatus for a power distribution system includes means for superimposing a modulating signal on apower distribution line in communicating from the source to a substation and switching means at the substation to generate a current signal of predetermined frequency in communicating from the substation to the power station.

This invention relates to communication systems; and more particularly, to a system for transmitting digital communications between a main source of power and remote substations receiving power over distribution lines from the main source.

One important object of the present invention is to provide apparatus for communicating between a central power station and remote substations receiving power from the central station over existing distribution lines.

Another object of the present invention is to provide apparatus for communication between a remote substation and the central power station wherein the communicating signal is a modulted signal drawing current from the distribution line thereby obviating the need, as in prior art system, to superimpose a voltage singal on the distribution line.

Another object of the present invention is to provide a system for communicating between a central power station and remote substations wherein complicated switching equipment is not required at the substations in order to keep track of which substation is communicating with the main power station.

Briefly, the above objects are accomplished by providing at the main power station a modulated voltage signal having a frequency between the fundamental and first harmonic of the main power signal and having a very narrow bandwidth. The signal is modulated to address any of the remote substations which have correspondingly-tuned detecting equipment for decoding the transmitted voltage signal and receiving only that information which is intended for it. The substations communicate with the main power station by switching a predetermined load on and off the distribution line to modulate the current generated at the main power station. It has been determined that if the main power signal is intermittently loaded at predetermined, periodic intervals, as by switching a fixed resistor across the power line without interrupting the main power flow, frequency components which are predictable and easily detected, can be generated over the distribution line and decoded at the main power station for communication to the main station from a remote substation.

Further objects and advantages of the present invention will be appreciated from the following specification accompanied by the attached drawing which is a schematic block diagram of a system according to the present invention.

Referring then to the drawing, a primary or source generator, designated generally as 10, and a source generator, designated generally as 12, are shown with their outputs connected in parallel to feed power to remote substations. The source generators 10 and 12 are conventional three-phase generators. A control unit 14 is shown schematically as controlling the power generated by source generator 10 and source generator 12 as well as regulating the phase of these generators so that the combined output power has uniform phase and is regulated. The illustration shows two source generators, 10 and 12, but it is to be understood that the invention is not restricted to two source generators and may be used with any number of such generators.

A local three-phase voltage generator 16 receives timing information from the second and third phases of source generator 12 to generate a three-phase signal having a frequency between the fundamental and first harmonic of the frequency of the source generator. A transmit data modulator 18 feeds the input of local voltage generator 16, and the output of local voltage generator 16 is a continuous sinusoidal wave-form which is blanked or unblanked (i.e., enabled to transmit or inhibit) according to whether there is a signal present from modulator 18, as will be explained further below.

One phase of the signal generated by voltage generator 16 which is in phase with phase one of the primary power signal is fed to a "phase one" transmit current transformer 20 surrounding the distribution line carrying the first phase of the primary power signal of source generator 10, and to a "phase one" tansmit current transformer 22 similarly associated with the first phase of source generator 12.

Similarly, the second phase of voltage generator 16 is fed to a "phase two" transmit current transformer 24 and a "phase two" transmit current transformer 26 associated respectively with the distribution lines carrying the second phases of source generators 10 and 12.

"Phase three" transmit current transformers 28 and 30 receive the third phase of voltage generator 16 and are similarly associated with the distribution lines carrying the third phase respectively of source generators 10 and 12.

The output of the phase one transmit current transformers 20 and 22 are combined to form the "phase one" distribution line 21 of the central power station. The "phase two" and "phase three" distribution lines, designated 23 and 25, of the central power station are similarly formed from the output of their respective transmit current transformers.

Monitors 32, 34, and 36 are coupled respectively with the phase one, phase two, and phase three distribution lines 21, 23, and 25. The monitors 32, 34, and 36 are preferably current transformers similar to those described above, but their function is to receive changes in current, as distinguished from changes in voltage as when transmitting from the main to remote stations, in their respective distribution lines when a remote substation is signaling the central power station, as described below.

A 60 cycle notch filter 38 receives the output of phase three monitor 36 and in turn feeds a detector 40 which drives an output device 42. The phase three detector 40 also receives reference timing information from the voltage generator 16 in order to decode received information.

Each of the other two phases of the central power station have similar detecting equipment, but its function and operation is the same as that shown for phase three, and so it has not been shown in the drawing.

The distribution lines from the central power station may then feed any number of remote substations, as is commonly done in power distribution systems. It will be noted that the drawing, for purposes of illustration, describes a distribution system which is typically a 60 cycle, three phase, 120 volt system, but the invention is not so limited.

A single substation is shown with complete equipment for communicating with the central power station, and it will be understood that any or all of the remote substations may be so equipped. Referring again to the drawing, the remote substation AA receives the third phase power line. Connected across the received power line is a series circuit comprising a 60 cycle notch filter 44, a narrow band receiver 46, and an output device 48. Also connected to the received power line and in series are a switching device 50 and a load 52 which preferably is a fixed resistor. A zero crossover detector 54 receives the voltage on the power line and drives a binary counter 56 which feeds one input to an AND gate 58. The other input to AND gate 58 is the information desired to be transmitted to the central station such as a local alarm, as shown.

OPERATION

Communication from the central power station to remotely located substation AA will now be described. Source generator 10 and source generator 12 are connected in parallel and feed any number of remote substations, which may receive 1, 2, or all 3 of the phases generated from the central power station. For simplicity of illustration, substation AA is shown as receiving only the third phase. The local three phase voltage generator 16 generates a three phase voltage which is to be superimposed upon the power distribution current and fed to the remote substations for communication. The output of voltage generator 16, as mentioned before is either present or not present depending on the serial binary information fed from input modulator 18 which serves to blank the output of voltage generator 16. That is, the output signal of voltage generator 16 is a pulse code modulated signal having a center frequency between about 70 and 110 c.p.s. for a typical 60 c.p.s. system. Serial binary information is therefore imposed on each one of the phases of the output signal of voltage generator 16. The data from transmit data modulator 18 to a remote substation fed by any of the three phases of the central power station is then communicated by conventional pulse code modulation techniques, but certain considerations must be taken into account before such communication can be made reliable. It will also be noted that by addition of two transmit data modulators, each of the distribution lines could operate independently to transmit data.

The first reliability consideration is the means for generating the voltage signal which is superimposed on the power signal. The preferred means, as shown in the drawing, includes current transformers connected in series (i.e. surrounding each of the primary conductors) of the three phases. Each current transformer superimposes a voltage on the power line proportional to the output voltage of voltage generator 16. It will be noted that the blanking of the output of voltage generator 16 by data modulator 18 has been chosen to be in phase with the first phase of the primary power, and will continue for each of the subsequent phases for as long as is required to give the desired signal to noise ratio on the power lines.

The next consideration in communicating from the main station to remote substations is the apparatus for detecting the imposed signal voltage at each of the substations. Preferably, this detecting equipment comprises, at each substation, a 60 cycle notch filter 44 to inhibit the passage of the fundamental followed by a narrow band receiver 46, which synchronously detects the pulse-modulated signal superimposed by data modulator 18 at the sending end by deriving timing information from the main power signal as shown. This arrangement advantageously makes use of the primary timing information contained in the distribution lines and eliminates the need for independent clock information being set between transmitting and receiving ends, as in conventional communication systems which operate synchronously. The receiver 46 then demodulates the information contained in the narrow band signal and drives an output device 48 such as a printer. It will be noted that depending on the complexity of the system at each substation, such an output device could well include control means for regulating the power factor at the substation if it were determined that such adjustment were necessary.

Another important consideration in determining the communication system between the central power station and a remote substation, is the voltage signal power required for reliable communications. Based upon the voltage noise distribution between 60 and 120 cycles that appears on a normal distribution line, one selects a desirable frequency for communication and then determines the bandwidth of the receiver and a desirable signal-to-noise power ratio for reliable communication. For this purpose, I have developed a mathematical model to predict the amount of noise voltage in the 70 to 110 c.p.s. range on a distribution line for a given average voltage.

In determining empirically the average RMS noise voltage or current for a given transmission system as a function of frequency, I prefer to use the apparatus discussed below. A twin-T network is placed in series with the line signal and feeds a narrow band wave analyzer, such as a Hewlett-Packard Model No. 302A. An amplifier/mixer circuit receives the output of the wave analyzer and feeds a tuning fork which drives a true-reading RMS volt meter. The wave analyzer is centered about the center frequency of interest, and it has a bandwidth of seven cycles. The analyzer was set to read only frequency components within this seven-cycle interval.

The input signal was mixed with a local oscillator which was tuned exactly the frequency of the tuning fork. The tuning fork acted as a very high Q filter, as are most mechanical filters, having a bandwidth of about one-half cycle. The output was recorded on the true-reading RMS volt meter. This reading was proportional to the RMS noise voltage contained in a one-half cycle bandwidth. From this empirical information, the relationship of Equation 1 was generated. This equation, in turn, is used in determining the signal power which must be superimposed at the source in order to communicate with a given signal-to-noise ratio to a remote substation.

Determination of the current noise spectrum as a function of frequency may be determined in a similar way except that a current transformer is used to surround the distribution line and couple a current signal, rather than a voltage signal, into the twin-T matching network.

The average RMS noise voltage may be expressed as a function of frequency for a 120 volt line, half-cycle of bandwidth as follows:

$$V(f)_{120} = -(0.05357)(10^{-3})(f-60)+3\times10^{-3} \quad (1)$$

In the above equation, $V(f)$ designates the average RMS noise present on a 120 volt line as a function of the frequency, $f$, between 70 and 110 cycles per ½ cycle of bandwidth. The general equation for any line voltage is expressed below:

$$V(f)_{\mathrm{line}} = (V_{\mathrm{line}}/120)^{1/2}V(f)_{120} \quad (2)$$

One then determines the noise power from the above equation and for a given receiver bandwidth and a given load from the following general equation:

$$P_N(f) = \frac{(V(f)_{120})^2}{R}\times B \quad (3)$$

where $P_N$ is the average noise power at a given frequency, R is the resistive value of the load and B is the bandwidth. For example, if the bandwidth of the receiver is two cycles per second, the receiver input impedance, or load, is 50 ohms, and the center frequency is 75 cycles per second, the noise power, equals:

$$P_N(75) = (V(75)_{12})^2\left(\frac{\text{volts}}{\text{½ cycle}}\right)\times 2\ \text{cycles}\times 1/50\ \text{ohms} \quad (4)$$

It will be noted that in the above, communication was from the central power station to a remote substation. The following description relates to a signaling or communicating from the remote substation back to the central power station. In the above description, the average noise voltage was required in order to determine the signal to noise level. In the following description, the noise current must be determined in order to communicate back to the source.

In communicating with the present system from a remote substation to the source, the noise current, as distinguished from noise voltage, is of interest. The average noise current for a one-hundred-and-six-ampere line is given below:

$$I(f)_{106} = -(0.325)(10^{-3})(f-60) + (23.2)(10^{-3}) \quad (5)$$

in units of RMS current per ½ cycle of bandwidth.

The more general equation for a line current of any value is then:

$$I(f)_{\text{line}} = (I_{\text{line}}/106)^{1/2} I(f)_{106} \quad (6)$$

Equations 5 and 6 may then be used to find the RMS noise current per ½ cycle of bandwidth for any nominal line current as a function of frequency in the 70 to 110 c.p.s. The noise current must be determined before establishing the remaining parameters for communicating between a substation and the central power station, because the method of communicating is to vary the line current in a predetermined manner to generate signal frequencies in the current being distributed from the source of power. These frequencies are then detected at the source and a substation is subquently addressed for communication.

I have determined that it is possible and advantageous to periodically add an additional load to the line to generate certain frequency components in the primary current. If a resistor is switched on and off in a predetermined manner, predictable frequency components will be generated on the distribution line without the need to superimpose a voltage in communicating back to the central power station. The presence of these predetermined frequency components, or one of the frequency components, is then detected at the central power station. By way of illustration, a particular embodiment will be described in connection with the drawing.

The zero crossover detector 54 is of a conventional construction which generates a pulse every time the voltage on the power line feeding substation AA crosses zero volts going from negative to positive. The binary counter 56 counts each crossover and comprises two bistable circuits connected in conventional counting fashion so that the most significant digit of binary counter 56 is in its logical "one" state for a successive two out of four cycles of the binary frequency. This output signal from the most significant digit of binary counter 56 feeds the AND gate 58 to enable it when some information signal such as the local alarm signal shown, is present. When both the output signal from binary counter 56 and the information signal are present at AND gate 58, switching device 50 is enabled and connects load 52 across the power line feeding substation AA thereby increasing the current flow to substation AA.

It will be noted that the load 52 is connected across the power line for two cycles in succession and is then removed for two cycles since AND gate 58 is disabled when the most significant digit of binary counter 56 is its zero logical state. Hence, the load draws current for two cycles and then interrupts this additional current for two cycles in a periodic fashion.

If the additional current drawn from the source as a result of periodically switching load 52 as described above is designated $i(t)$, the Fournier series of $i(t)$ is given below:

$$i(t) = \frac{A}{2}\sin(2\pi 60t) + \sum_{n}^{\infty} \frac{8A}{(16-n^2)}\cos(2\pi 15nt) \quad (7)$$

where A is the amplitude and $n$ is an odd integer.

The frequency components of this current wave form are seen to be 15, 45, 60, 75, 105, 135, etc., cycles per second. These are the individual frequencies present when the load is switched on and off the line in exactly two cycle intervals for a long period of time. The simplicity of this method of communicating with the source is obvious.

The frequency components established in the current from the central power station by switching a load in the above-described manner at a remote substation are detected at the central power station by means of a current transformer monitoring the primary current of each phase. Hence, a phase three monitor 36 detects any such deviations generated in the current of the third phase of the primary power source. A 60 cycle notch filter 38 blocks the fundamental and feeds a narrow band detector 40 having a bandwidth of two cycles per second. Since detection is on a time base with phase three, detector 40 derives timing information from the third phase of the local voltage generator 16. The detector 40 then demodulates and decodes the information from the substation AA and feeds an output device 42.

From the previous discussion, we have determined that a 75 c.p.s. signal is present on the power line of phase three by periodically switching the load 52. Phase detector 40 at the central station is therefore tuned to a bandwidth of 74 to 76 c.p.s. to detect the signal which may be pulse modulated at the substation as described in connection with transmission from the main power station to remote substations.

It will be obvious to those skilled in the art that there are structures equivalent to those illustrated which can be used in the practice of my invention, and it is intended that such equivalents and modifications be covered within the spirit and scope of the invention.

What is claimed is:

1. A system for communicating between a main source of power having at least one multi-phase, single-frequency generator and remote substations receiving power from said source over distribution lines comprising:

means receiving the main power signal for generating a local signal in phase with and having a frequency between the fundamental and first harmonic of the frequency of the main power signal;

means receiving said local signal for transmitting said local signal across said distribution lines to said substations;

modulator means at said main source controlling said transmitting means for modulating said local signal to communicate with said substations;

detector means at a remote substation including tuning means tuned to the frequency of said local signal for demodulating the received local signal to recover the information transmitted therewith;

a load at said substation;

switching means at said substation coupling said load to said distribution line for periodically switching said load in and out of circuit with said distribution line thereby generating a current signal of predetermined frequency components on said distribution line;

modulator means at said substation for controlling said switching means and modulating said current signal to communicate with said main power source; and source detecting means monitoring the current transmitted across said distribution lines for detecting said modulated current signal at said power source.

2. The apparatus of claim 1 wherein said main source of power has a frequency of 60 cycles per second and said means for generating said local signal generates a signal having a frequency between 70 and 110 cycles per second.

3. The apparatus of claim 1 wherein said transmitting means receiving said local signal comprises first, second and third current transformers, each of said transformers being associated with one phase of the main power source.

4. The apparatus of claim 1 wherein said main source modulator means includes a pulse code modulating means for blanking and unblanking said local signal transmitting means to transmit a pulse-code-modulated signal to said substations.

5. The apparatus of claim 2 wherein said remote substation tuning means is tuned to block the main 60 cycle signal, and wherein said substation load is a fixed resistor.

6. The apparatus of claim 4 further comprising:
a zero-crossover detector at said substation receiviing said main power signal for generating a pulse responsive to each positive crossover of said main power signal;
a binary counter receiving the output signal of said zero-crossover detector for counting the output pulses therefrom to produce a periodic signal of a harmonic of said main power signal; and
means for gating said switching means responsive to said counter output signal and a local information signal.

7. The apparatus of claim 5 further comprising an AND gate for controlling said switching means, one input of said AND gate receiving the output signal of said substation modulator means, the other input of said AND gate receiving a binary signal in phase with said main power signal.

8. The apparatus of claim 6 wherein said binary counter comprises two stages whereby said load is switched across the distribution line for two successive cycles and removed therefrom for the two succeeding cycles in repeating pattern; and
wherein said source detecting means discriminates at a center frequency of 75 cycles per second.

9. In a power distribution system having a source generator for generating a polyphase voltage of constant frequency and transmitting the same to a remote substation over power lines, apparatus for communicating from said remote substation to the main power source comprising detector means at said substation sensing the signal on one of said power lines to generate a control signal in timed relation thereto and having a frequency of one-half the frequency of said source, a load at said substation, switching means at said substation responsive to said control signal for selectively switching said load to said line at one-half the source frequency to generate a current signal in said power line having predetermined frequency components other than said frequency of said source, and detector means at said source monitoring the distributed current in said power lines for sensing said component of said switching current signal at a frequency other than said source of frequency and any harmonic thereof.

10. The apparatus of claim 9 further comprising modulator means at said remote substation for selectively enabling said switching means to transmit serial binary data representative respectively of the absence or presence of said harmonic of said switching frequency.

References Cited

UNITED STATES PATENTS

| | | | |
|---|---|---|---|
| 2,457,607 | 12/1948 | Seymour. | |
| 2,860,324 | 11/1958 | Berger et al. | 340—310 |
| 3,406,383 | 10/1968 | McFarlane | 340—207 |

DONALD J. YUSKO, Primary Examiner

U.S. Cl. X.R.

340—310, 408